(12) United States Patent
Brassier et al.

(10) Patent No.: US 6,373,818 B1
(45) Date of Patent: Apr. 16, 2002

(54) METHOD AND APPARATUS FOR ADAPTING WINDOW BASED DATA LINK TO RATE BASE LINK FOR HIGH SPEED FLOW CONTROL

(75) Inventors: Rene Brassier, Nice; Denis Esteve, Vence; Jean-Pierre Marce, St. Jeannet; Pascal Thubert, Vence, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/094,114

(22) Filed: Jun. 9, 1998

(30) Foreign Application Priority Data

Jun. 13, 1997 (EP) .............................. 97480034

(51) Int. Cl.[7] .................................. H04J 3/24
(52) U.S. Cl. ....................... 370/232; 370/231
(58) Field of Search ................ 370/231, 232, 370/233, 234, 235, 236, 237, 238, 244, 252, 253, 465, 468, 477, 428; 709/227, 228, 229

(56) References Cited

U.S. PATENT DOCUMENTS

| | | | | |
|---|---|---|---|---|
| 5,130,986 A | * | 7/1992 | Doshi et al. ................. | 370/236 |
| 5,592,627 A | * | 1/1997 | Burt et al. .................... | 709/227 |
| 5,764,625 A | * | 6/1998 | Bournas ....................... | 370/229 |
| 5,995,486 A | * | 11/1999 | Iliadis ........................ | 370/229 |

FOREIGN PATENT DOCUMENTS

EP 0454364 A2 10/1991 ........... H04L/12/56

OTHER PUBLICATIONS

Perros et al., Semaphore Queues: Modeling Multilayered Window Flow Control Mechanisms, IEEE, pp. 309–317, 1990.*
Suk et al, Performance Comparison of Two Window Flow Control Schemes with Admission Delay, ieee, pp. 892–896, 1990.*
Gong et al., Study Of A Two–Level Flow Control Scheme and Buffering Strategies, IEEE, pp. 1224–1233, 1994.*
"Congestion Control Strategies for Mixed X.25/Frame Relay Networks" by A.J. Vernon, T. Jawor, S. Rabie, D. Whiting & H. Badran XP000438768, Jan. 5, 1994, Bell–Northern Research, Ontario Canada.
"A Taxonomy for Congestion Control Algorithms in Packet Switching Networks" by C. Yang and A. Reddy XP000526590, 8302 IEEE Network, Jul./Aug. 1995 #4, New York US, pp 34–45.
"An Effective Mean Rate Policing Scheme: Moving Ceiling Scheme" by J. Park et al, XP000622956, Globecom'95, IEEE, Nov. 14–16, 1995, vol. 2, pp 71–75.

* cited by examiner

Primary Examiner—Wellington Chin
Assistant Examiner—Frank Duong
(74) Attorney, Agent, or Firm—John B. Frisone

(57) ABSTRACT

A system and method for converting a window based data link flow control to a rate based flow control. In addition to the conventional data link control window, a second window is established under control of an adaptive committed information rate (ACIR). When either the DLC window or the second window is closed information frames are queued. The second window is closed when a frame exceeds the burst size authorized in the ACIR.

4 Claims, 7 Drawing Sheets

Double Windowing flow chart.

Transmission queue description without the application of the invention

Windowing flow without the application of the invention

Frame Relay Network components

Flow control performing by the invention

Windowing flow with the application of the invention

Transmission queue description with the application of the invention

Double Windowing flow chart.

METHOD AND APPARATUS FOR ADAPTING WINDOW BASED DATA LINK TO RATE BASE LINK FOR HIGH SPEED FLOW CONTROL

FIELD OF INVENTION

The present invention relates to high speed data networking and, more particularly, to the adaptation of legacy window-based Data Link Control (DLC) protocols to modern Rate Based link accesses such as Adaptive Committed Information Rate over Frame Relay Network.

BACKGROUND ART

The present invention makes references to the following standards:

ANSI T1.617, T1.618 and T1.606 (addendum); and
ITU-T Q933 and Q922, 802.2

The present application is also based on another patent application whose title is "Method for adapting committed information rate over frame relay switched network" by Esteve et al. filed on the same date.

The terminology that is used throughout the description is as follows:

FR: Frame Relay: A High speed switched network, with statistical multiplexing.

FH: Frame Handler concerns the function of FR layer 2 that handles frames switching in the network.

TE: Terminating Equipment is a gateway from FR, it handles upper layer 2 and layer 3 functions.

AD: Access Device, a FRAD usually converts LAN traffic into FR traffic and so forth.

TDM: Time Division Multiplexing, it is used for splitting bandwidth in timely slots.

ISDN: Integrated Services Digital Network, it is another high speed network, with TDM.

TA: Terminal Adapter, it is used to convert leased/dial line into a channel (FR, ISDN).

Bc: Committed Burst size, it represents the number of bytes that can be sent in a burst according to CIR.

Be: Excess Burst size, it represents the additional bytes of Bc that may or may not be carried by the network.

Tc: Period over which Bc is sent its value is generally computed according to the formula CIR=Bc/Tc.

CIR: Committed Information Rate which represents a bit rate that is subscribed from a carrier.

V_CIR: Variable CIR which is the classical recommendation according to the standard organizations as mentioned above.

A_CIR: Adaptive CIR is the environment in which the present invention is implemented.

ARB: Adaptive Rate Base represents the ability to perform flow control by adapting a transmission rate.

PVC: Permanent virtual channel is a leased end to end path through the FR network.

DLC: Data Link Control, associated with OSI layer 2, provides link access functions for upper layers. 802.2 DLC is also referred as a LLC (logical link control) as it is mostly used to access logical links or virtual channels.

DLCI: Data Link Control Identifier which identifies a PVC over a given hop.

ECN: Explicit Congestion Notification where a bit is piggy-backed in FR Q922 header to notify of a congestion (which happens generally in the FH function). The ECN uses the pair FECN/BECN of congestion management.

FECN: Forward ECN which is generally set by FH function in a frame that passes through a congested node and sends a signal to the receiving or destination FRTE, advising it to slow down the receipt of information.

BECN: Backward ECN. Flows on the way back from which the congestion was experienced to the source FRTE of the traffic in order to pace it down.

Bottleneck: The node or the line in the network that limits the throughput over a PVC. Both the bottleneck location and its throughput are subject to change overtime.

LAN: Local Area Network, it interconnects station within a single plant (campus). Tendency is to go from the old shared media model to a switched model for higher throughput.

WAN: Wide Area Network. Everything from the most common modem in a PC to Serial Optical Network, it interconnects stations and LANs over long distance serial links.

Most telecommunication protocols use window based mechanisms for doing their flow control (for instance with protocols SNA, TCP). Transporting Windows over High Speed lines requires huge window sizes and control becomes very poor.

Without an Adaptive Rate Based or A_CIR, when a node any where in the network cannot obtain the expected throughput owing to the FRTE having a fixed CIR, a logical bottleneck forms.

Thus, its throughput (TH) limits the FRTE traffic. The minimum size of the window (in bytes) at the FRTE that is required to keep the bottleneck busy is Wmin=TH*TAT, wherein TAT stands for the Turn Around Time of the network which is caused by propagation, store_and_ forward effect and encoding delay.

For instance, it takes a window of 100*2 Kbytes frames to keep a 100 Mbps link busy over 1000 miles.

Most of that window will end up being queued in the bottleneck. At high speed, the bottleneck latency and memory requirements become unacceptable. In consequence, the window size decreases, which in turn causes a poor utilization of the link. This case of implementation according to the prior art is shown in FIG. 3.

This leads to two consequences: firstly, the window based protocols are not efficiently transported over high speed lines unless heavy multiplexing takes place, and secondly, modern protocols rather use ARB mechanisms.

When window_based protocols are transported by a Frame Relay network, an Adaptive Committed Information Rate (A_CIR) can be used as an ARB so that the network logical bottlenecks move to the Terminating Equipment (TE). Provided that, the CIR queue in the TE is now the place were the huge unwanted queuing takes place. This is shown in FIG. 4.

The problem this invention addresses is determining how to keep the network busy while protecting CIR queues in the Terminating Equipment, in the case of high speed FR lines with adaptive CIR.

OBJECT OF THIS INVENTION

Figure 1:
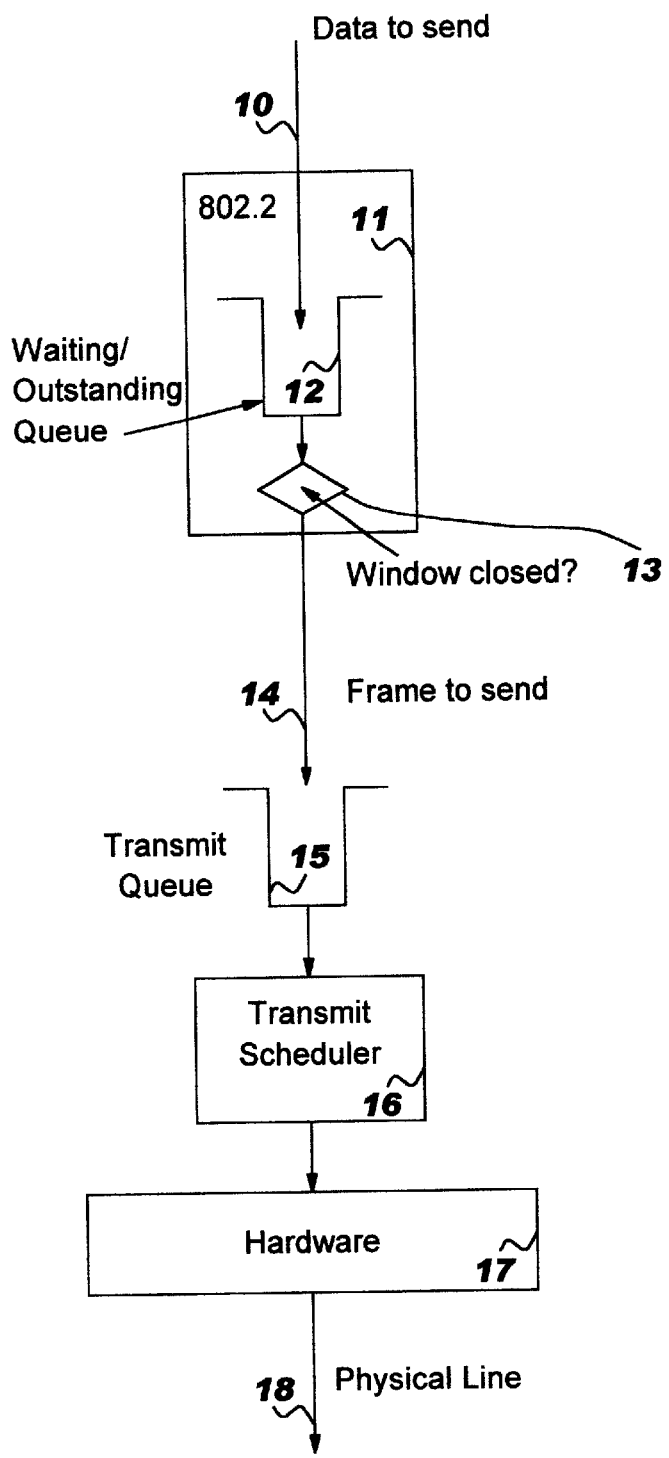
FIG. 1 shows the environment of the transmit queue in the FRTE according to the prior art.

As far as Frame Relay is involved, Committed Information Rate standard is not an Adaptive Rate Base such as described more in detail in another related patent application whose title is "Method for adapting committed information rate over frame relay switched network".

Assuming CIR can be adaptive and can tune itself to match the throughput of a bottleneck in the network, like an ARB does, the logical bottleneck now occurs in the FRTE itself.

The traffic that is sent by the FRTE is consequently smoother and the network can then be kept busy.

The problem is that the conventional DLC layer still sends a huge window that will be queued right away in the CIR queue. This results in the introduction of latency in the data path, and in an inefficient use of DLC resources. The DLC resources are wasted because timers are started and frames are queued in outstanding queues though they were not really sent yet.

The solution according to the present invention is an interaction between the Committed Information Rate (CIR) and the Data Link Control (DLC) layer that handles the window mechanism (which can be for instance a 802.2 for SNA INN traffic).

The present implementation does not modify the external view of the FRTE that still performs its DLC functions in the same way. It aims to allow the size window to be huge so that the link utilization can remain efficient on high speed links.

It also aims to protect the CIR input queue from receiving the DLC full window in a burst, while keeping it busy in order to achieve an optimal throughput.

Frames are emitted by the DLC layer only when they can be transmitted within the allowed CIR, so that retry timers do not run uselessly for them.

Pacing to an upper layer prevents from having more outstanding frames than necessary.

Thanks to the adaptive CIR, the FR network view of that traffic is that of on ARB flow control. Thus, it is adapted to high speed by keeping the nodes and links busy but not overflowed.

Finally, it also an object of the invention to apply to most window based protocols that are transported over CIR/ARB network.

SUMMARY OF THE INVENTION

In order to fulfill the above mentioned object, the present invention adds a second level of flow control within the Frame Relay Terminal Equipment (FRTE) box between the Data Link Control (DLC) and the Committed Information Rate (CIR) or the Adaptive Rate Base (ARB) mechanism. Henceforth, the usage of the original Data Link Control window is dedicated to recovery processes while the flow control is performed by a new window.

Since the Data Link Control and the Adaptive Rate Base share the same processor or a local area network, a simple window mechanism is enough for the ARB to back pressure the DLC. For instance they may be linked by a local area network in the case of a Frame Relay Access Device (FRAD), by a short range serial line in the case of a Terminal Adapter (TA), or by a bus in the case of an imbedded adapter card.

The DLC is slightly modified so that even when the original external window allows more transmission, it will restrain itself to what the new local window allows, which is actually the rate that can be sent to the network by ARB.

In a preferred embodiment sliding windows such as 802.2 are implemented. Sliding windows means that the current window may be partially acknowledged before it is fully sent in order to smooth the data traffic.

DETAILED DESCRIPTION OF THE INVENTION

The simplest way of achieving a local flow control is to use a semaphore for granting transmission authorization. This can apply when the DLCI is not shared between several protocols such as SNA stations, TCP etc, and when DLC and ARB share the operating system.

In a multiprotocol environment where a plurality of protocol stacks share the same virtual channel, a window will be preferred instead of a semaphore. One window is granted to each user which may be a protocol or a link station.

The user (i.e. an 802.2 link station doing SNA APPN traffic) passes up to its window to the CIR, and flags the first frame with a Pacing Request information. When the CIR mechanism schedules the flagged frame on the line transmit queue, it reopens the window for that user (by issuing a function call or a high priority Pacing Response message, or by raising a semaphore). A little bit less than 2 windows can at most be outstanding between the DLC and the ARB, which limits queue sizes in the CIR.

The window size will determine the "weight" of a protocol, that is the share of the available bandwidth that is "reserved" for that protocol.

Therefore, in the present invention, there are two windows instead of one:

The huge external DLC window that is relieved from its flow control functionality so it can now be kept large enough to keep the network efficiently used, and the one added by this invention, generally internal to the FRTE and very small, that does not affect the external behavior of the DLC, but that carries the Adaptive CIR or ARB back pressure so that flow control actually is ensured the ARB as opposed to the 802.2 external window.

Thanks to adaptive CIR, the FRTE itself is now the logical bottleneck along the PVC path. Only the transient intermediate queue of an emerging logical bottleneck can take place in the network, till CIR adapts. As a result, the network is protected and can operate efficiently.

FIG. 1 shows the main components of the data transmission lower layers according to the prior art. The DLC (11) is an 802.2 standard logical link control. It is responsible for deciding when it should keep (12) or send (14) data frames based on frame availability and acknowledgements (13) received from the remote end 802.2 DLC. Frames are directly passed to a hardware or a device driver transmit queue (15) from which a transmit scheduler (16) feeds an encoding hardware (17) at a speed the physical media (18) can support.

Figure 6:
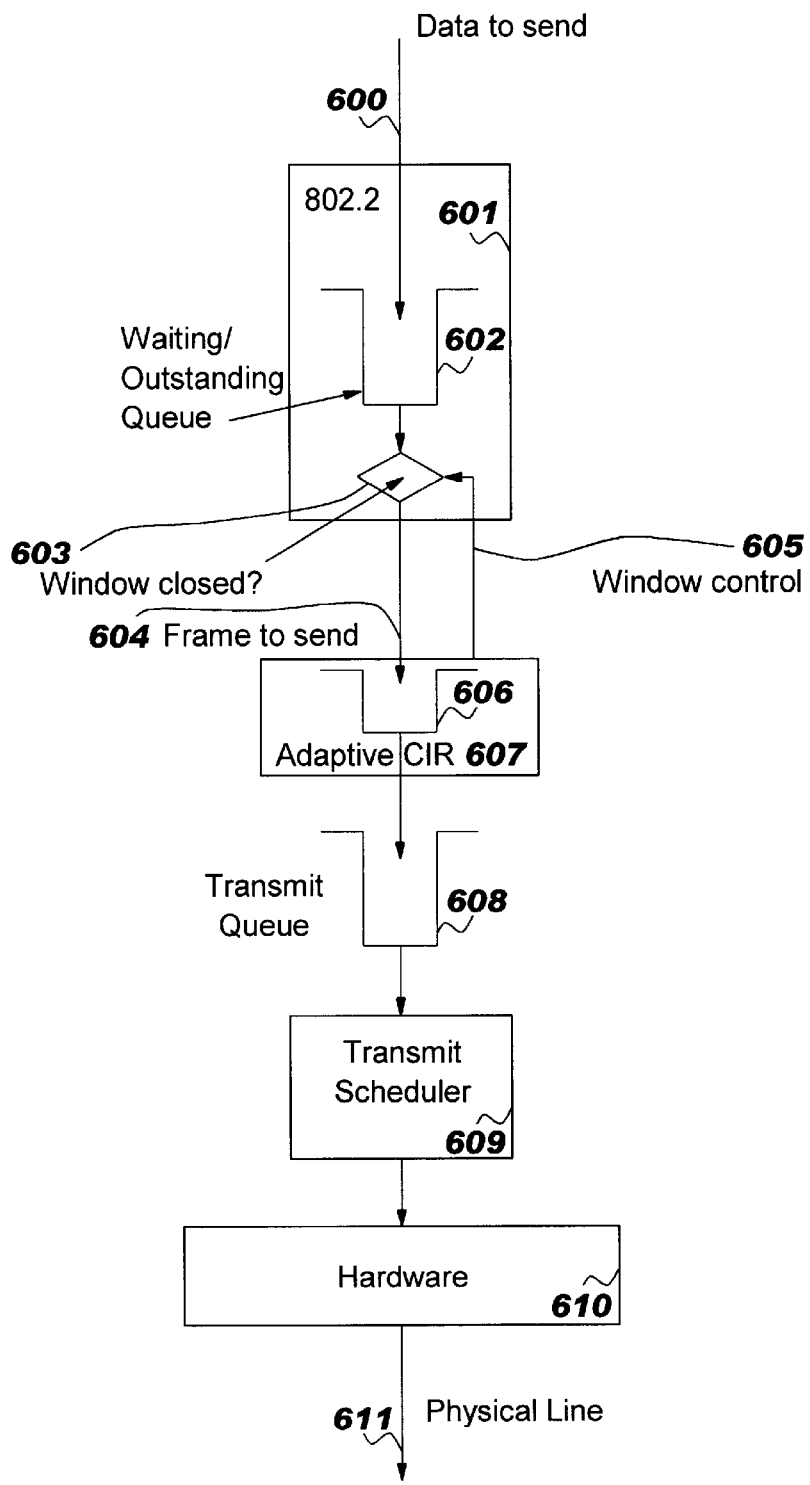
FIG. 6 shows the environment of the transmit queue in the FRTE according to the present invention.

By comparing the environment in FIG. 1 according to the prior art and the one in FIG. 6 according to the present invention, it can be seen that the Adaptive CIR function (607) and the local window (605) are implemented between the 802.2 DLC (601) and the transmit queue (608). This latter sends the traffic to the hardware (610) that handles the physical line (611). Note that 802.2 and adaptive CIR do not have to be packaged to share the same processor. Still, they are "local" when the other end 802.2 DLC is "remote", in a LAN versus WAN sense. The local window (605) is the object of this invention. It ensures the transmission of the back pressure from the Adaptive CIR to the 802.2 DLC so that the throughput of a window based DLC is actually a rate based flow.

Figure 2:
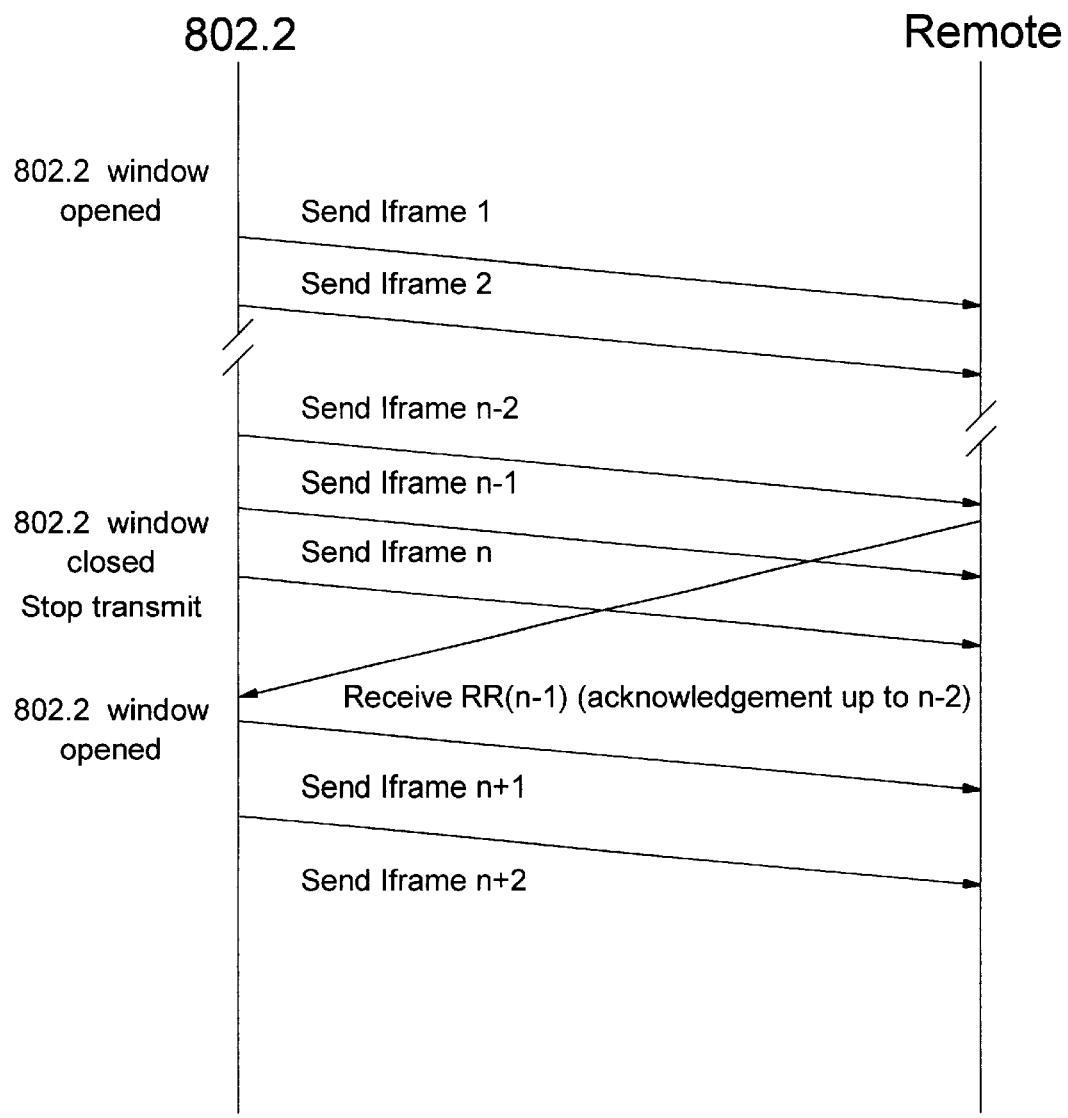
FIG. 2 illustrates an example of a window based protocol (802.2) between a transmitting FRTE and a remote FRTE according to the prior art.

FIG. 2 shows the 802.2 windowing operations according to the prior art. The size window must be large enough so that acknowledgements may cross traffic, in which case they will be received in time to keep the bottleneck busy. However, a window that is too large will cause congestion by accumulation in the bottleneck entry. It is almost impossible to define the right window size.

In case of congestion, a dynamic windowing takes place that reduces the window size. Generally, the window size is so reduced that the bottleneck is not kept busy and bandwidth is wasted. The outlook of the traffic is bursty because frames 1 to n are sent and then traffic stops.

Figure 5:
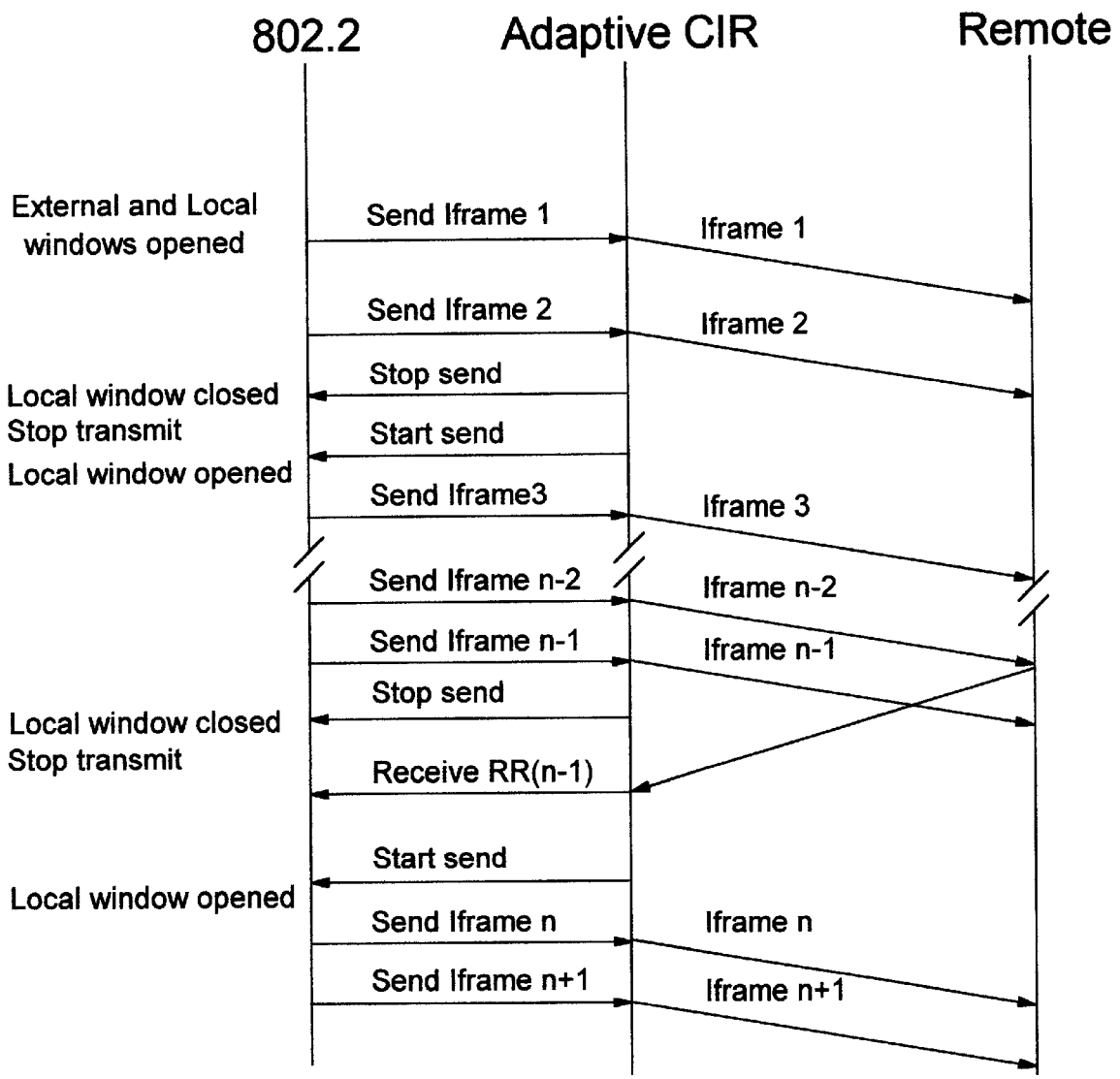
FIG. 5 shows the local window performing flow control between DLC and ARB/A_CIR layers on top of the external window according to the present invention.

As opposed to the prior art illustrated in FIG. 2, the traffic shown in FIG. 5 is smoother in the sense that bytes are sent more regularly, per little groups of frames and on a timely basis. As a consequence, the traffic is desynchronized from the 802.2 windowing mechanism. The transmit rate is enforced by the adaptive CIR that is a prerequisite to this invention. The end to end 802.2 window size can now be defined very large so that acknowledgements are always received in time. Henceforth, the traffic is never blocked by the legacy 802.2 window based flow control.

The windowing flow represented in FIG. 5 shows how the local window added according the present invention operates. The interface that is implemented to control the local window between the adaptive CIR and the 802.2 DLC can be based on a start/stop protocol, or on a semaphore if common operating system services are available. That interface can also be based on a window size. This will happen in a multiprotocol environment, and when the CIR and the 802.2 functions cannot share operating system services. This is not represented in FIGS. 5 and 7.

Figure 3:
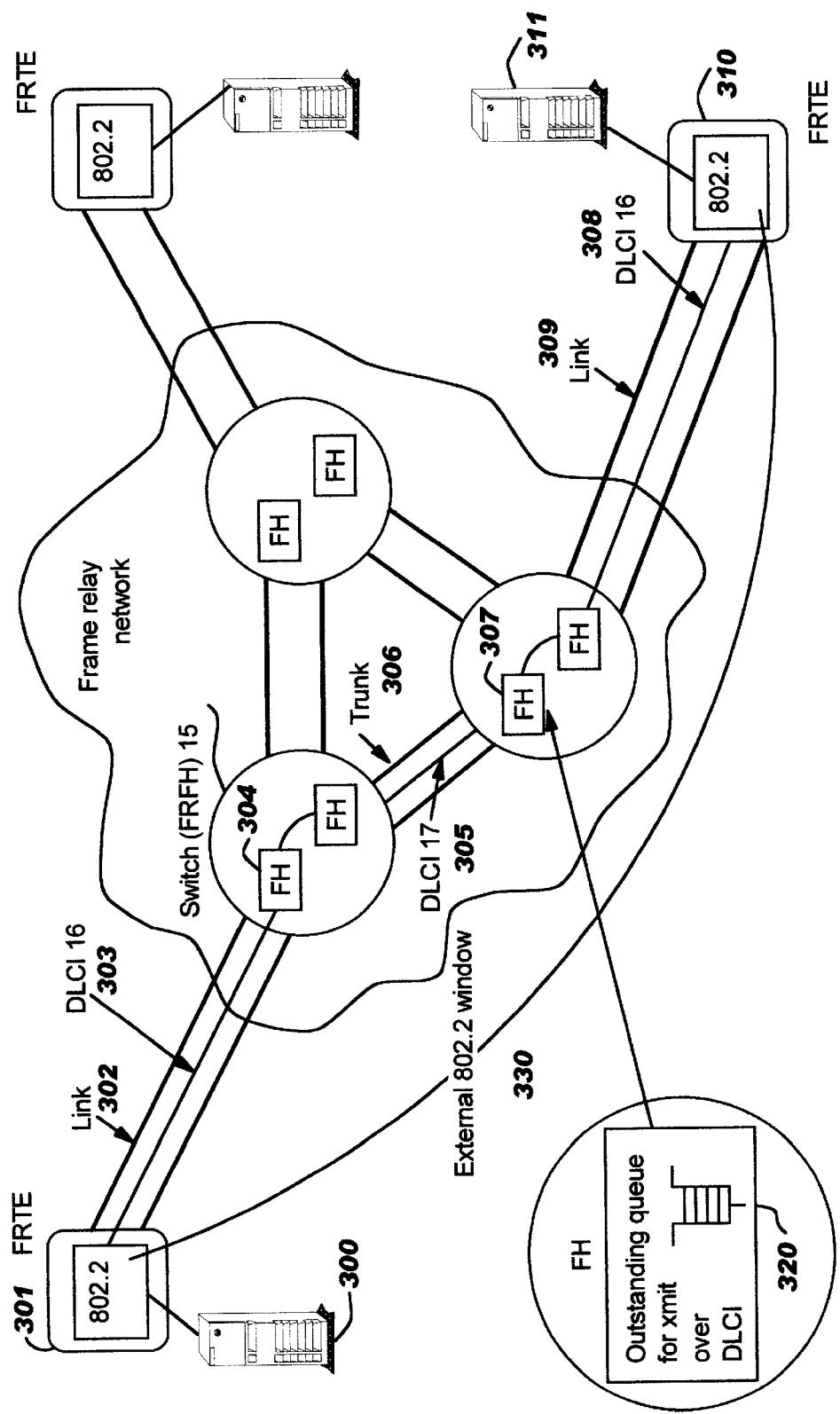
FIG. 3 shows the Frame Relay Network components according to the prior art in which a bottleneck within the switched network may occur when no ARB is implemented.

FIG. 3 represents a view of a common frame relay network with a 802.2 window based protocol handling the end to end flow control through its dynamic external window. The outstanding queue for transmit over the DLCI (320) represents a potential bottleneck on the path from a transmitting FRTE (301) to a remote FRTE (310). Most of the frames of the 802.2 window end up queued in the bottleneck if link (309) happens to be the limiting factor at the moment.

The external end to end 802.2 window (330) ensures both the flow control and the recovery of data transmission between the transmitting FRTE (301) and the remote FRTE (310).

Figure 4:
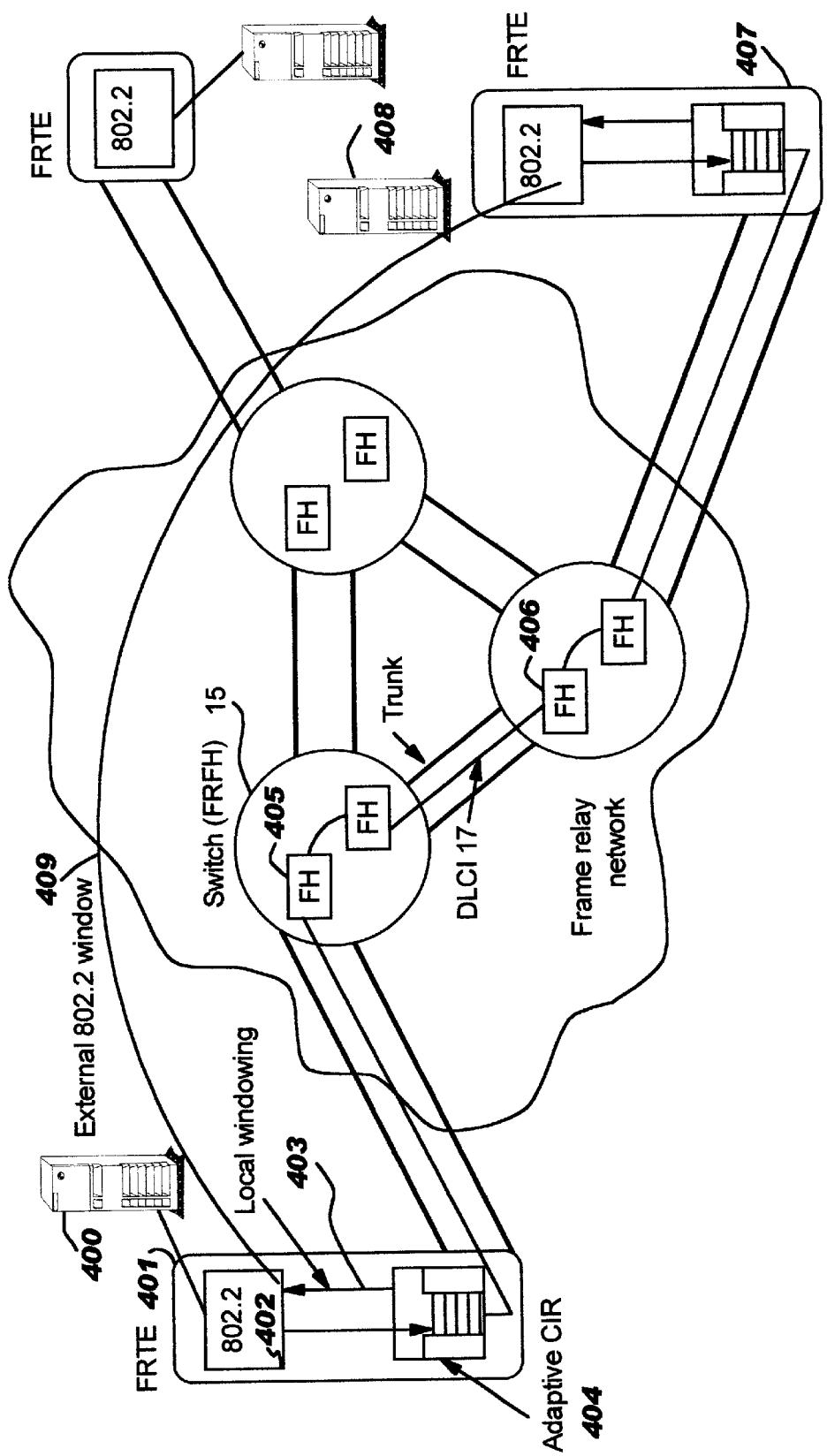
FIG. 4 shows the environment according to the present invention in which an ARB (or adaptive CIR) relocates the queuing back from the FRFH to the FRTE.

The flow control performed according to the present invention is shown in FIG. 4. The 802.2 external window is relieved from its flow control function. The potential bottleneck back pressures the Adaptive CIR so as to avoid the formation of a queue in the network. In consequence, the network latency and the intermediate nodes memory requirements are reduced.

Figure 7:
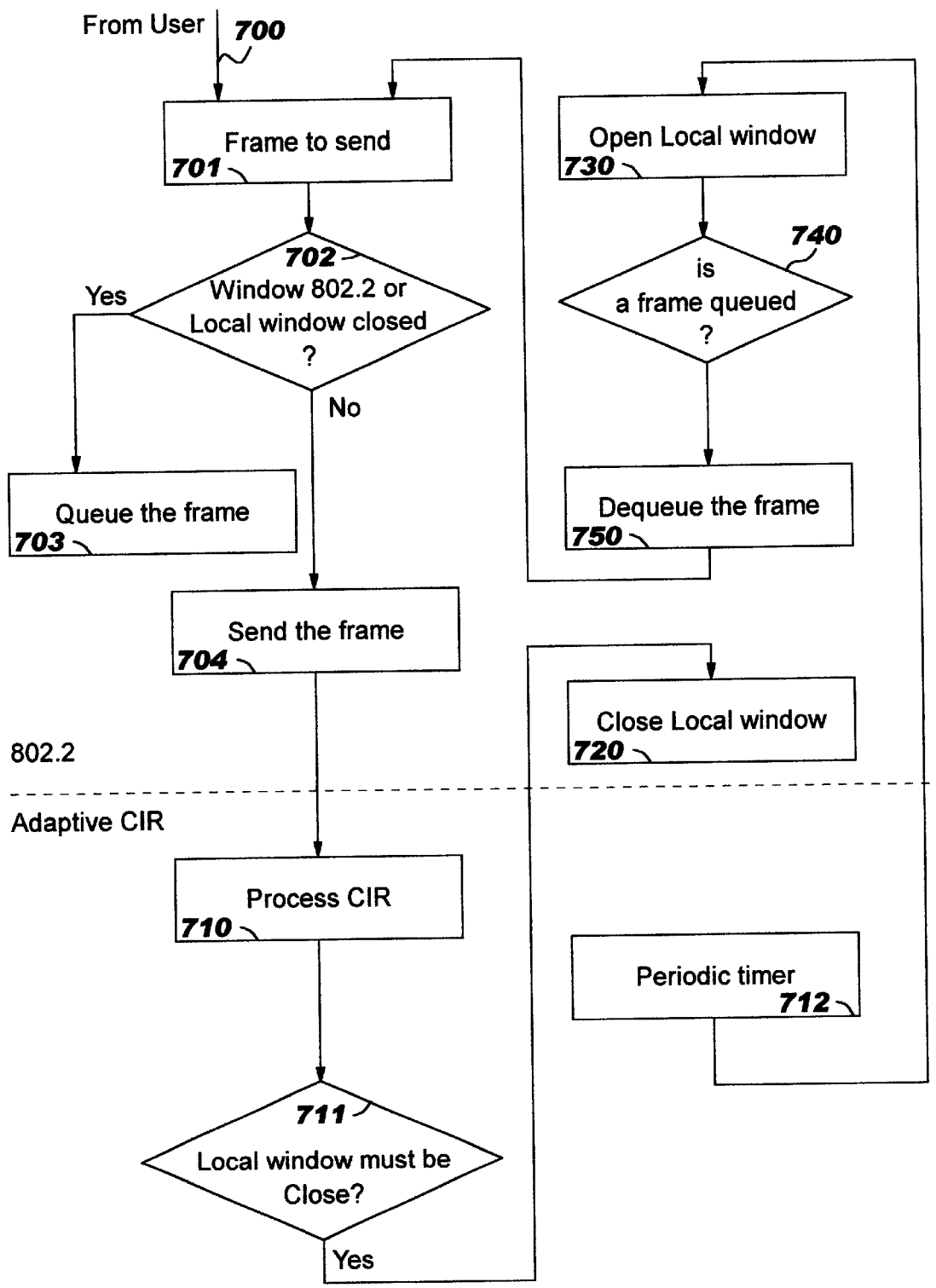
FIG. 7 represents the flow chart of the double windowing illustrating the interaction of the local windowing and the transmitting FRTE.

FIG. 7 illustrates the flow chart of the local windowing according to the present invention.

This implementation is preferred in the case of a single user that shares operating system facilities with the ARB functions.

When a frame (701) is received (700) from the upper layer, the 802.2 DLC has to decide whether to queue (703) or transmit (704) the frame. The frame will be transmitted to the remote only if both the 802.2 external window and the local window are opened (702).

The adaptive CIR (710) is responsible for deciding when the local window should be opened or closed (711). If the current frame size exceeds the authorized burst size, the CIR will close the local window (720), otherwise it leaves it open.

When the CIR decides to reopen the window (730), which happens on a timely basis (712), frames that are waiting to be transmitted (740) will be dequeued (750), and sent until the local window or the 802.2 window are closed (702).

The present invention directly applies to the Internet as long as the IP traffic is carried over a frame relay backbone. When the FRTE in the internet server uses a window based protocol such as TCP, this protocol stack can be adapted to interoperate with an adaptive CIR so as to avoid the slow start mechanism and to pace its transmitting rate up to the optimal throughput the frame relay network can support.

What is claimed is:

1. In a data communication network including a data link control protocol, a plurality of interconnected frame handlers (FH) and a plurality of terminating equipments (TE) each connected to a frame handler by a data link control identifier (DLCI), a method for converting a window based data link flow control to a rate based flow control comprising the steps:

in the network generating an adaptive committed information rate (ACIR) for indicating the data transmission capacity of the network and transmitting it to the terminating equipments (TE);

in at least one of the terminating equipments establishing a first window having an open and a closed data transmission state in accordance with the data link control protocol and controlling the open or closed data transmission state of the first window in accordance with the data link control protocol;

establishing a second window having an open or closed data transmission state and controlling the open or closed data transmission state of the second window in response to a predetermined received ACIR;

queuing data frames when either the first or second window is in a closed state; and, periodically opening the second window and dequeuing any queued frames.

2. The method set forth in claim 1 which the ACIR includes a data burst size and closing the second window when the frame size exceeds the burst size authorized in the ACIR.

3. In a data communication network including a data link control protocol, a plurality of interconnected frame handlers (FH) and a plurality of terminating equipments (TE) each connected to a frame handier by a data link control identifier (DLCI), a system for converting a window based data link flow control to a rate based flow control comprising:

means for generating an adaptive committed information rate (ACIR) as a function of network traffic;

means for controlling a first window having an open and a closed data transmission state in accordance with said data link control protocol means for controlling a second window having an open and a closed data transmission state and closing the second window in response to a predetermined generated adaptive committed information rate;

means for queuing data frames for later transmission when either the first or second window is in a closed state; and, means for periodically opening the second window and dequeuing any queued frames.

4. The system set forth in claim 3 in which the ACIR includes an authorized data burst size and the means for controlling the second window, closes the window when the frame size exceeds the burst size authorized in the ACIR.

* * * * *